US 6,584,273 B1

(12) United States Patent
Ashley et al.

(10) Patent No.: US 6,584,273 B1
(45) Date of Patent: Jun. 24, 2003

(54) FRAME-ACCURATE EDITING OF ENCODED A/V SEQUENCES

(75) Inventors: Alexis S. Ashley, Redhill (GB); Octavius J. Morris, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/333,631

(22) Filed: Jun. 15, 1999

(30) Foreign Application Priority Data

Jun. 27, 1998 (GB) ............................................. 9813831

(51) Int. Cl.[7] ............................................. H04N 5/76
(52) U.S. Cl. ......................................... 386/52; 386/111
(58) Field of Search ............................... 386/4, 33, 52, 386/64; 360/111–112, 13; 369/83; 345/723; H04N 5/76, 9/79, 5/92

(56) References Cited

U.S. PATENT DOCUMENTS

| 5,696,557 | A | | 12/1997 | Yamashita et al. ........... 348/390 |
| 5,923,811 | A | * | 7/1999 | Kawamura et al. ............ 386/65 |
| 6,285,361 | B1 | * | 9/2001 | Brewer et al. ................. 386/52 |
| 6,341,192 | B1 | * | 1/2002 | Fujinami ..................... 386/52 |
| 6,400,886 | B1 | * | 6/2002 | Brewer et al. ................. 386/52 |

FOREIGN PATENT DOCUMENTS

| EP | 0759617 A2 | 2/1997 | ......... G11B/27/032 |
| JP | 09097344 A | 8/1997 | ........... G06T/11/00 |
| WO | WO9706531 | 2/1997 | ........... G11B/20/00 |

OTHER PUBLICATIONS

EP 98200888.0 (PHN 16,815), Ser. No. 09/266,329.

* cited by examiner

*Primary Examiner*—Thai Tran
(74) *Attorney, Agent, or Firm*—Michael E. Belk (57) ABSTRACT

A method and apparatus are provided for generating bridge segments to enable editing jumps to be made from one A/V segment to another while handling timing and frame constraints imposed by the A/V segment compliance with coding conventions, such as MPEG. The bridge segment is constructed by copying data from the two sequences to be bridged, with some demultiplexing, decoding, remultiplexing and re-encoding of this data to maintain the validity of the edited data stream. Different procedures in terms of copying and/or re-encoding are applied in dependence on the picture encoding types at the source and destination of the edit via the bridging segment.

23 Claims, 4 Drawing Sheets

FRAME-ACCURATE EDITING OF ENCODED A/V SEQUENCES

The present invention relates to the storage, retrieval and editing of frame-based coded audio and/or video data particularly, but not essentially, in conjunction with optical disc storage for the data and the use of MPEG-compliant coding schemes.

In recent times, a need has arisen for both domestic and commercial audio and/or video (herein "A/V") apparatuses to support a greater amount of user interactivity, and arising from this is a need for seamless joining of A/V segments in which the transition between the end of one segment and the start of the next may be handled smoothly by the decoder. This implies that from the user's point of view there is no perceptible change in the viewed frame rate and the audio continues uninterrupted. Applications for seamless video are numerous, with particular domestic uses including the editing of home movies and the removal of commercial breaks and other discontinuities in recorded broadcast material. Further examples include video sequence backgrounds for sprites (computer generated images); an example use of this technique would be an animated character running in front of an MPEG coded video sequence. Another is a series of character-user interactions presented as short seamless clips where the outcome of an interaction will determine which clip appears next. A development of this is interactive motion pictures where the user (viewer) can influence the storyline. Branch points along the path a user chooses to take through the interactive movie should appear seamless, otherwise the user will lose the suspension of disbelief normally associated with watching a movie.

A problem with frame-based coding schemes, in particular those such as the MPEG-compliant schemes involving predictive encoding between frames for at least the video content, is that it is not possible to simply jump from the last frame in a first group of pictures (GOP) to the first frame of a new GOP, let alone from one arbitrarily selected frame to another. This is due to temporal dependencies, timing and buffering constraints among others, as will be discussed further hereinafter.

It is therefore an object of the present invention to enable readout of stored audio and/or video clips or frame sequences in a way which allows them to be joined without causing perceptible disturbances.

In accordance with the present invention there is provided a data processing apparatus comprising means operable to read sequences of frame-based data from a storage device and to edit the same, such as to link from a first edit point in a first frame sequence to a second edit point in a second sequence, wherein for each of the stored frame sequences a number of the frames (hereinafter referred to as "I-frames") are intracoded, without reference to any other frame of the sequence, a number (hereinafter referred to as "P-frames") are respectively coded with reference to one further frame of the sequence, and the remainder (hereinafter referred to as "B-frames") are respectively coded with reference to two or more further frames of the sequence; the apparatus including bridge generation means configured to create a bridge frame sequence to link the first and second edit points, by selective incorporation of frames from the stored first and second frame sequences and selective recoding of one or more of the frames within the bridge sequence as determined by the coding type (I, P, or B) of the frames from the first and second sequences indicated by the respective edit points.

Also in accordance with the present invention there is provided a method for editing sequences of frame-based data such as to link from a first edit point in a first frame sequence to a second edit point in a second sequence, wherein for each of the frame sequences a number of the frames (hereinafter "I-frames") are intra-coded, without reference to any other frame of the sequence, a number (hereinafter "P-frames") are respectively coded with reference to one further frame of the sequence, and the remainder (hereinafter "B-frames") are respectively coded with reference to two or more further frames of the sequence; the method including the step of creating a bridge frame sequence to link the first and second edit points, the bridge frame sequence incorporating frames from the first and second frame sequences with selective recoding of frames within the bridge sequence being determined by the coding type of the frames from the first and second sequences indicated by the respective edit points.

By use of the bridge sequence generation, which may be effected by a suitably configured subsection of a signal processing apparatus handling data transfer to and from the storage device, a means is provided to address the problem of making video- and/or audio-frame accurate edits in MPEG-compliant and similar program streams where, because of the temporal dependencies and buffering models used in such coding and multiplexing techniques, simple cut-and-paste edits cannot be made at any frame boundary.

Further features of the present invention are recited in the attached claims, the disclosure of which is incorporated herein by reference, and to which the readers attention is now directed. These and other aspects of the invention are further described in terms of exemplary, but non-limiting, embodiments below.

Preferred embodiments will now be described by way of example only, and with reference to the accompanying drawings in which.

The following description considers in particular A/V devices operating according to the MPEG standards (ISO/IEC 11172 for MPEG1 and, in particular, ISO/IEC 13818 for MPEG2) although the skilled practitioner will recognise the applicability of the present invention to other A/V coding schemes not in conformance with the MPEG standard.

The following describes how the present invention addresses the problem of making video- and/or audio-frame accurate edits in an MPEG Program Stream where, because of the temporal dependencies and buffering models used in MPEG coding and multiplexing, simple cut-and-paste edits cannot be made at any frame boundary.

In order to facilitate editing, bridge sequences are generated—that is to say short sequences of MPEG data that are especially constructed (in a manner to be described) to link together two original recordings of MPEG data. As will be described, in certain circumstances, it becomes necessary to partially decode and re-encode sections of this data in order to construct a valid MPEG stream.

The final element in the video edit is a control structure or play list. This instructs the play-back system how to sequence through the streams. It contains the out-point from the original stream and information about the start of the bridge sequence. It contains information about where to jump into the second stream from the end of the bridge sequence. It may also contain other information to make management of the play back easier.

Figure 1:
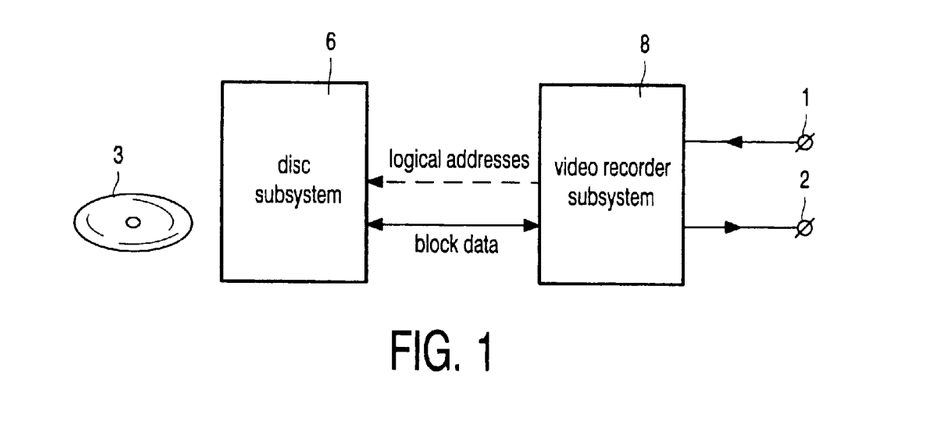
FIG. 1 is a block schematic representation of an optical disc record/reply apparatus suitable to embody the invention.

FIG. 1 shows an embodiment of an apparatus suitable to host the present invention, in the form of an optical disc record and playback device. In the description of the apparatus, the handling of frame-based video signals is concentrated upon, although it will be recognised that other types of signal may alternately or additionally be processed, such as audio or data signals, and that the invention is equally applicable to other memory devices such as magnetic data storage means and computer hard disc drives.

The apparatus comprises an input terminal 1 for receiving a video signal to be recorded on optical disc 3. Further, the apparatus comprises an output terminal 2 for supplying a video signal reproduced from the disc.

The data area of the disc 3 consists of a contiguous range of physical sectors, having corresponding sector addresses. This address space is divided into sequence areas, with a sequence area being a contiguous sequence of sectors. The apparatus as shown in FIG. 1 is decomposed into two major system parts, namely the disc subsystem 6 and what is referred to herein as the video recorder subsystem 8 controlling both recording and playback. The two subsystems are characterised by a number of features, as will be readily understood, including that the disc subsystem can be addressed transparently in terms of logical addresses and can guarantee a maximum sustainable bitrate for reading and/or writing.

Figure 2:
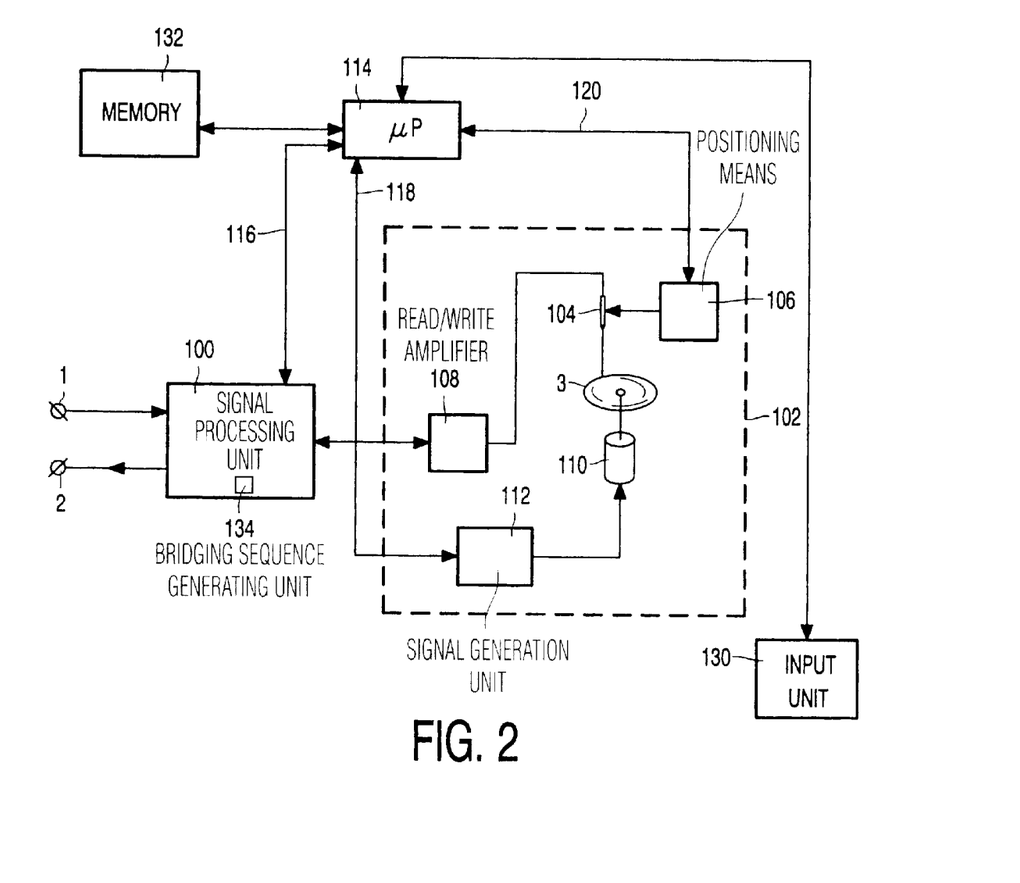
FIG. 2 is a more detailed schematic showing components within the apparatus of FIG. 1.

FIG. 2 shows a schematic version of the apparatus in more detail. The apparatus comprises a signal processing unit 100 which is incorporated in the subsystem 8 of FIG. 1. The signal processing unit 100 receives the video signal via the input terminal 1 and processes the video data into a channel signal for recording on the disc 3. A read/write unit indicated by dashed line 102 is provided, incorporated in the disc subsystem 6 of FIG. 1. The read/write unit 102 comprises a read/write head 104 configured for reading from/writing to optical disc 3. Positioning means 106 are present for positioning the head 104 in a radial direction across the disc 3. A read/write amplifier 108 is present in order to amplify the signals to and from the disc 3. A motor 110 rotates the disc 3 in response to a motor control signal supplied by signal generation unit 112. A microprocessor 114 is present for controlling all the circuits via control lines 116, 118, and 120.

The signal processing unit 100 is adapted to convert the video data received via the input terminal 1 into blocks of information in the channel signal: the size of the blocks of information can be variable but may (for example) be between 2 MB and 4 MB. The write unit 102 is adapted to write a block of information of the channel signal in a sequence area on the disc 3. The information blocks corresponding to the original video signal are written into many sequence areas that are not necessarily contiguous, as may be seen in the recording diagram of FIG. 3, which arrangement is known as fragmented recording. It is a characteristic of the disc sub-system that it is able to record and write such fragmented recordings fast enough to meet real-time deadlines.

In order to enable editing of the video data recorded in an earlier recording step on the disc 3, the apparatus is further provided with an input unit 130 for receiving an exit position (out-point) in a first video signal recorded on the disc 3 and for receiving an entry position (inpoint) in a second video signal recorded on that same disc. Additionally, the apparatus comprises a bridging sequence generating unit 134, incorporated in the signal processing unit 100, for generating the bridging sequence to link the two video streams as is described in detail hereinafter.

Figure 3:
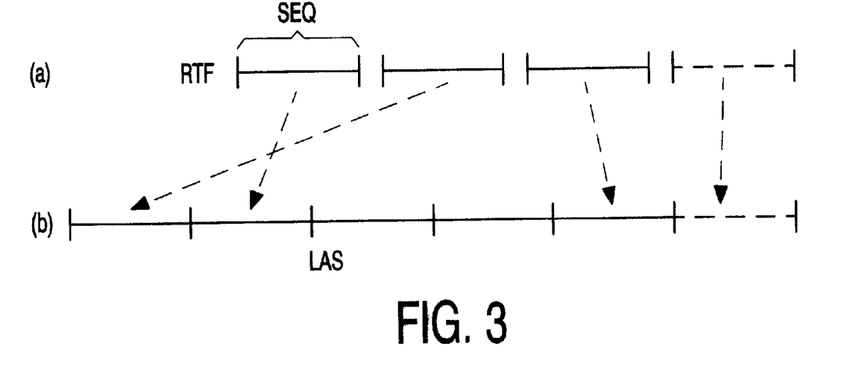
FIG. 3 represents the recording of blocks of information in sequence areas on an optical disc.

Recording of a video signal will be briefly discussed with reference to FIG. 3. In the video recorder subsystem, the video signal, which is a real time signal, is converted into a real-time file RTF as shown in the upper part of FIG. 3. The real-time file consists of a succession of signal block sequences SEQ for recording in corresponding (although fragmented) sequence areas. There is no constraint on the location of the sequence areas on the disc and, hence, any two consecutive sequence areas comprising portions of data of the video signal recorded may be anywhere in the logical address space LAS as shown in the lower part of FIG. 3. Within each sequence area, real time data is allocated contiguously. Each real time file represents a single A/V stream. The data of the A/V stream is obtained by concatenating the sequence data in the order of the file sequence.

Figure 4:
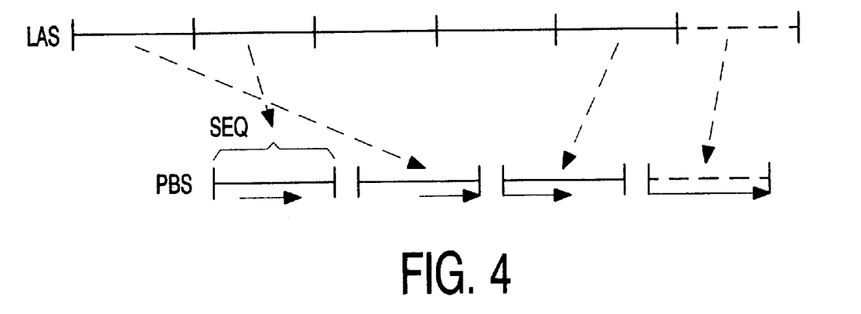
FIG. 4 represents the playback of information stored on the disc in FIG. 3.

Next, playback of a video signal recorded on the disc 3 will be briefly discussed with reference to FIG. 4. Playback of a video signal is controlled by means of a playback control (PBC) program. In general, each PBC program defines a new playback sequence PBS, which may comprise an edited version of recorded video and/or audio segments, and may specify a sequence of segments from respective sequence areas. As may be seen from comparison of FIGS. 3 and 4, the PBC required to recreate the original file sequence (from FIG. 3) re-orders the fragmented recorded segments to provide a playback frame succession corresponding to the original sequence.

Figure 5:
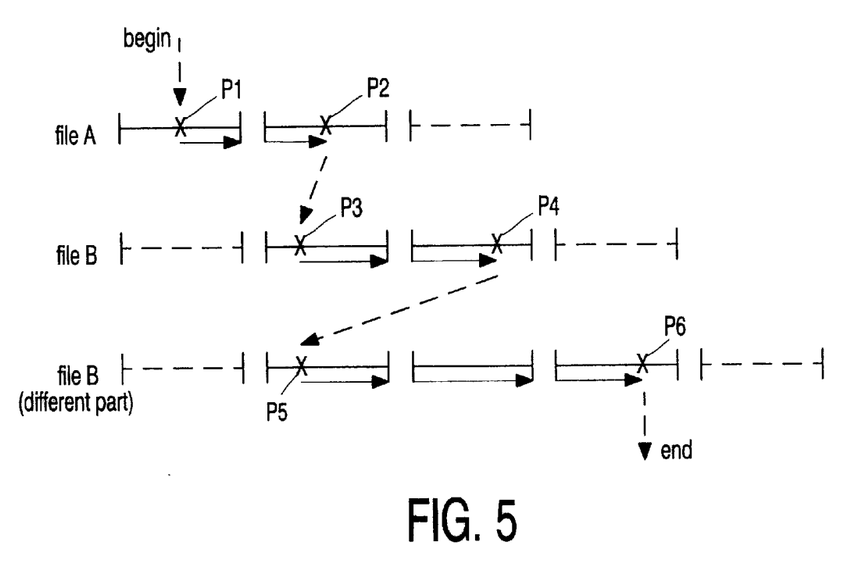
FIG. 5 generally illustrates the editing of stored video data, with bridge sequences omitted.

The editing of one or more video signals recorded on the disc 3 is discussed with reference to FIG. 5, which shows two video signals indicated by two sequences of fragments named "file A" and "file B". For realising an edited version of one or more video signals recorded earlier, a new PBC program is generated for defining the A/V sequence obtained by concatenating parts from earlier A/V recordings in a new order. The parts may be from the same recording or from different recordings. In order to play back a PBC program, data from various parts of (one or more) real time files has to be delivered to a decoder. This implies a new data stream that is obtained by concatenating parts of the streams represented by each real-time file. In FIG. 5, this is illustrated for a PBC program that uses three parts, one from file A and two from file B.

FIG. 5 shows the edited version starts at a point P1 in the succession of areas of file A and continues until point P2 in the next sequence area of file A. Then reproduction jumps over to the point P3 in the sequence area in file B and continues until point P4 in a further sequence area in file B. Next reproduction jumps over to the point P5 in the same file B, which may be a point earlier in the succession of sequence areas of file B than the point P3, or a point later in the succession than the point P4. From the point P5 in the sequence area in file B reproduction continues until point P6.

The generation of bridge sequences for the transitions P2–P3 and P4–P5 has been omitted from FIG. 5 for reasons of clarity: the reasons for, and means for generation of, these bridge sequences will now be considered.

As will be generally understood, the following examples relate to frame-based rather than field-based editing: this is because the general unit of video encoding in MPEG is the frame. It will be recognised by the skilled person that MPEG compliance is not mandatory (as mentioned above) and that the techniques described herein may be also applied to non-MPEG field-based data.

In order to create a seamless edit from one MPEG stream to another using a bridge sequence, a number of factors and conditions have to be observed, as summarised below and considered in detail hereinafter.

Beginning with the elementary streams, and considering first the video issues:

Field sequence: the sequence (top-bottom) must be preserved across all jumps, into or out from the bridge sequence.

Resolution change: if there is a change in resolution, seamless playback can be guaranteed if required. The apparatus can be simplified if a limited number of permissible resolution levels (e.g. half or full) can be used.

3:2 pull-down: the field sequence (top-bottom) must be preserved across all jumps.

Mixed frame rates (e.g. from NTSC or PAL): in these circumstances, seamless playback can only be guaranteed with additional cost and complexity to the apparatus, as this mixing requires a change of vertical sync for the display. Such mixing of standards and hence frame rates should therefore be avoided wherever possible.

Picture types: different operations will be required depending on the picture type (I,P,B) involved, as discussed below.

Turning now to the audio issues, the first is that of gaps. For an edit in a combined A/V stream, the join will generally be seamless in video, but there may be a discontinuity in the audio frame structure—either in the form of a gap or an overlap, due to audio frames generally being of different duration to video frames. To handle this, information is needed in the playlist to help player control. Another audio issue is that of frame structure, with it being the responsibility of the creator of the bridge sequence to ensure that a continuous sequence of complete audio frames is presented to the decoder.

Considering multiplex issues, jumps in the System Clock Reference (SCR) time-base can happen at any frame boundary at the connection, and consequently the decoder has to be able to reconstruct the correct time-base. Additionally, across all seamless jumps, System Target Decoder (STD) bounds must be respected, with it being the responsibility of the process that creates a bridge sequence to ensure this. From multiplexing, the issue of audio skew arises: in a typical implementation there will be a skew between the arrival times of concurrently decoded audio and video. To handle this, the decoder must have the facility for reading additional frames of audio from the multiplexed stream before a jump can be made.

Finally, the principal disc buffering issue is that of allocation requirements, with it being the responsibility of the process that creates the edit to ensure that the requirements for minimum contiguous areas are met.

Figure 6:
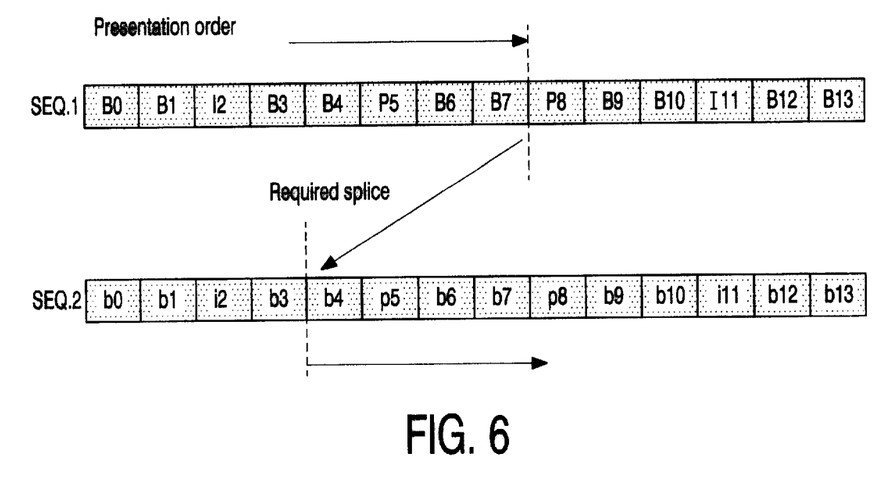
FIG. 6 represents the required splice points for a pair of MPEG video picture streams in presentation order.

As previously suggested, connections in terms of decoding and presentation of the video stream are to be made seamlessly, as generally illustrated in FIG. 6. Therefore, unnecessary pictures after the out-point or before the in-point are excluded during a process that re-encodes a part of the sequences around the edit point. Continuous supply of data is a precondition for the seamless decoding, which supply must be guaranteed by the file system.

Figure 7:
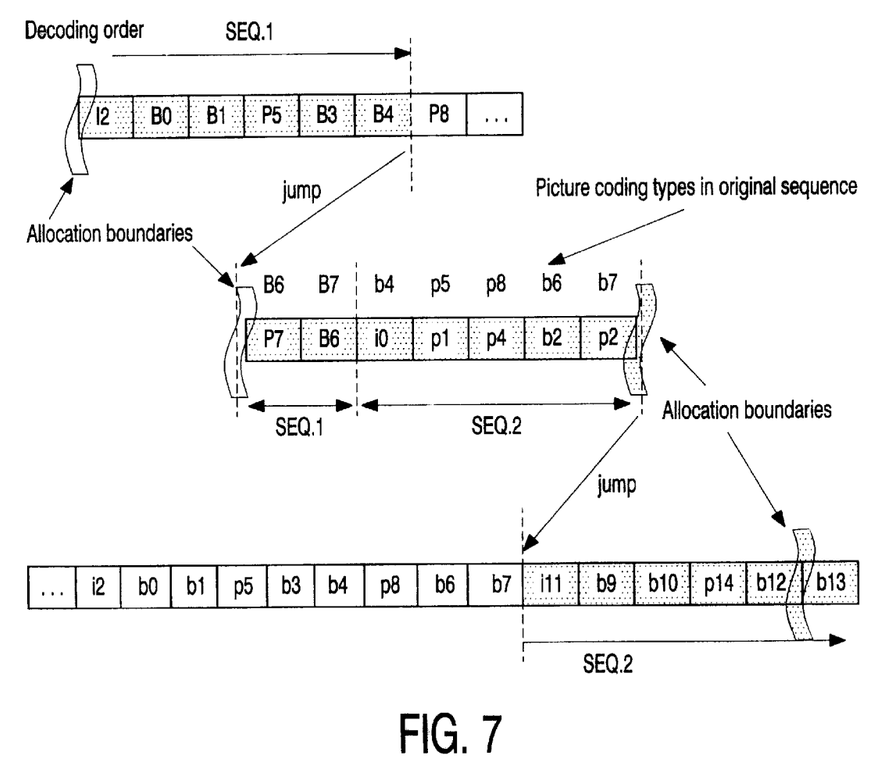
FIG. 7 illustrates sequence boundaries in relation to a generated bridge sequence.

At the end of a sequence before the connection (SEQ.1), an MPEG End of Sequence code is placed and at the start of the sequence after the connection point (SEQ.2) there is a sequence header. The video material at the end of SEQ.1 and the start of SEQ.2 is likely to need to be re-encoded. As shown in FIG. 7, the connection is made by creating a video bridge sequence. The bridge sequence consists of re-encoded video from the original content on either side of the out-point and in-point. The first part of the bridge forms the end of SEQ.1. It is a piece of coded video up to and including the intended out-point. It is re-encoded to connect to the previous frames of SEQ.1 and form a continuous, compliant elementary stream. Similarly, the second part of the bridge forms the head of SEQ.2. It consists of coded data from the in-point in SEQ.2 onwards. This data is re-encoded to give an effective start point for decoding, and to connect to the rest of SEQ.2 to form a continuous, compliant elementary stream. The video-bridge contains the connection between the two sequences. All video data in SEQ.1 and SEQ.2 is compliant with the MPEG-Video specification, with SEQ.2 starting with an I-picture and GOP header. The I-picture is the first presentation unit in that GOP (temporal reference=0). This ensures that there is a "clean break" between the video data of the sequence, and means that the last byte of video data from SEQ.1 is delivered before any bytes of video data from SEQ.2 are delivered. Additional restrictions imposed include that the video presentation units defined in the bit-stream shall be continuous across the connection, with neither frame nor field gaps in the presentation at the connection.

In terms of audio, the difference in video and audio frame sizes can lead to a gap in the sequence of audio presentation units at a connection. Although a gap of less than one audio frame duration may be tolerated, it is preferred to insert a further audio frame at this point such that there is an overlap in the definition of audio presentation units of less than one audio frame period. For multiplexing issues, the end of SEQ.1 and the start of SEQ.2, the sections that form the bridge sequence are re-encoded and remultiplexed and stored in a multiplex-bridge to ensure that a STD model is obeyed. To meet the requirements of this STD model, the multiplex bridge is likely to be longer in time than the bridge sequence. The timing of all presentation units before, during and after the connection point is determined by a single reference time-line such that in the play-back model the connection is seamless.

For file allocation, the connection is constructed so that continuous supply of data is guaranteed by the file system. This is done by allocating the multiplex-bridge as part of a new allocation that is connected to the bodies of SEQ.1 and SEQ.2. Choosing the jump point out of the original data in SEQ.1 to a new allocation containing the end of SEQ.1 to satisfy conditions on allocation of contiguous blocks of data to enable real-time supply of data, the new allocation must at least contain the multiplex-bridge. This new allocation may be longer than the multiplex-bridge if required. The length of the bridge allocation (containing the end of SEQ.1 and the start of SEQ.2, including the multiplex-bridge) should be chosen to satisfy conditions on the permissible extent of such fragments, and the point at which SEQ.2 jumps back to the original data sequence should be chosen to satisfy the above-mentioned condition on the allocation of contiguous blocks.

It should be noted that the jump points near the end of SEQ.1 and near the start of SEQ.2 are not directly linked to the start and end of the multiplex-bridge. They should be chosen by the system creating the edit to meet the allocation rules. It is always possible to chose jump points to meet the continuous supply conditions for an arbitrary choice of edit in- and out-point.

At the video sequence level, frames can either be copied from the original sequence or decoded and then re-encoded to form the bridge sequence. The decision as to whether to re-encode (for improved quality) or copy (for improved speed) relies on one of several reasons:

Re-encoding may be unavoidable because the reference picture used is no longer present;

Re-encoding is indicated because the reference picture has changed, but because it is the same picture content (although re-encoded) it may be decided to copy rather than re-encode, trading accuracy for speed;

Re-encoding is chosen in order to reduce the bit-rate.

There are a few combinations of cases that have to be considered, as will be described below. In these examples, the letters I, P, and B have their conventional meanings in terms of MPEG picture or frame types; the subscript numerals following the frame-type letters indicate the frame display order, the subscript letters indicate source or destination, and the bold type face identifies the particular frame illustrating the current example.

The first example has the source picture (frame in the first sequence) to jump out from as a B-picture.
In display order:
$I_{0s}B_{1s}B_{2s}P_{3s}B_{4s}B_{5s}P_{6s}B_{7s}B_{8s}P_{9s}B_{10s}B_{11s}$
In bit-stream order:
$I_{0s}B_{-1s}B_{-2s}P_{3s}B_{1s}B_{2s}P_{6s}B_{4s}B_{5s}P_{9s}B_{7s}B_{8s}$
If the jump is direct from frame $B_{5s}$, the decoder will incorrectly display $P_{6s}$. Therefore, if the edit-out point is a B-picture, the jump must be made on the previous (display order) P-picture and recode the B-pictures in the bridge sequence. The sequence of pictures up to the out point is then:

$I_{0s}B_{-1s}B_{-2s}P_{3s}B_{1s}B_{2s}$ REF_PIC $B^*_{4s} B^*_{5s}$ where REF_PIC is a reference (I or P) picture taken from the destination stream, and $B^*_{4s} B^*_{5s}$ correspond in picture content to source stream frames $B_{4s}$ and $B_{5s}$ but are re-encoded based on the new reference picture.

In an alternative arrangement, to ensure a "clean break" connection as explained above, the picture coding type of $B^*_{4s}$ should be changed to P-frame so that the injection into the source sequence of REF_PIC from the destination sequence is avoided. With this change, the sequence of pictures up to the out point becomes:

$I_{0s}B_{-1s}B_{-2s}P_{3s}B_{1s}B_{2s}P^*_{4s}B_{5s}$

In the next example, the source picture to jump out from is a P- or I-picture. In display order, the original sequence is:
$I_{0s}B_{1s}B_{2s}P_{3s}B_{4s}B_{5s}P_{6s}B_{7s}B_{8s}P_{9s}B_{10s}B_{11s}$
In bit-stream order:
$I_{0s}B_{-1s}B_{-2s}P_{3s}B_{1s}B_{2s}P_{6s}B_{4s}B_{5s}P_{9s}B_{7s}B_{8s}$
If the out point is $P_{6s}$, then the jump is made after $B_{5s}$ in bit-stream order. All pictures in the sequence jumped out from will decode correctly and can therefore be simply copied. The case is the same for an I-picture instead of a P-picture.

In the third example, the destination picture to jump to is a B-picture. In display order the original destination sequence is:

$I_{0d}B_{1d}B_{2d}P_{3d}B_{4d}B_{5d}P_{6d}B_{7d}B_{8d}P_{9d}B_{10d}B_{11d}$
In bit-stream order the original destination sequence is:
$I_{0d}B_{-1d}B_{-2d}P_{3d}B_{1d}B_{2d}P_{6d}B_{4d}B_{5d}P_{9d}B_{7d}B_{8d}$
The composite bridge sequence is:
X X X X X X X X $P_{6d}B_{4d}B_{5d}P_{9d}B_{7d}B_{8d}$
where the X's are the pictures copied or re-encoded from the source sequence. There are two cases (depending on whether we jump on an I-/P-picture or a B-picture, as above) with the respective following possibilities for the XXX stream:

$I_{0s}B_{-1s}B_{-2s}P_{3s}B_{1s}B_{2s}$ REF_PIC $B^*_{4s} B^*_{5s}$
$I_{0s}B_{-1s}B_{-2s}P_{3s}B_{1s}B_{2s}P_{6s}B_{4s}B_{5s}$

In either case $P_{6d}$ needs to be re-encoded as it has lost its reference picture; $B_{4d}$ must be removed from the sequence; $B_{5d}$ must be re-encoded; and $P_{9d}$ and all other pictures in the GOP (Group of Pictures) should be re-encoded because $P_{6d}$ has been re-encoded. Normally however it may be possible to simply copy $P_{9d}$ and accept limited quality degradation caused by mismatch, although all pictures after the splice may need the temporal reference to be changed. Again, in order to preserve the clean break at the connection, we can re-encode and change the picture type of $P_{6s}$ to I-frame. $B_4$ must be excluded and $B_5$ is re-encoded. Again, all frames should be re-encoded, but it may be deemed sufficient to simply recalculate the temporal references.

The last of these examples considers the case where the destination picture to jump to is an I- or P-picture. In display order the original destination sequence is:

$I_{0d}B_{1d}B_{2d}P_{3d}B_{4d}B_{5d}P_{6d}B_{7d}B_{8d}P_{9d}B_{10d}B_{11d}P_{12d}B_{13d}$-$B_{14d}$-$P_{15d}$

In bit-stream order the original destination sequence is:
$I_{0d}B_{-1d}B_{-2d}P_{3d}B_{1d}B_{2d}P_{6d}B_{4d}B_{5d}P_{9d}B_{7d}B_{8d}P_{12d}B_{10d}B_{11d}P_{15d}$-$B_{13d}B_{14d}$ The composite bridge sequence is:
X X X X X X X X $P_{9d}B_{7d}B_{8d}P_{12d}B_{10d}B_{11d}$
where the X's are the pictures copied or re-encoded from the source sequence. As before, there are two cases, depending on whether we jump on an I/P or a B-picture, with the following generalised possibilities for the XXX stream:

$I_{0s}B_{-1s}B_{-2s}P_{3s}B_{1s}B_{2s}$ REF_$B^*_{4s} B^*_{5s}$
$I_{0s}B_{-1s}B_{-2s}P_{3s}B_{1s}B_{2s}P_{6s}B_{4s}B_{5s}$

In either case $P_{9d}$ needs to be re-encoded as it has lost its reference picture, $B_{7d}$ and $B_{8d}$ must be removed from the sequence as neither are relevant to the edited stream, and $P_{12d}$ and all other pictures in the GOP should be re-encoded because $P_{9d}$ has been re-encoded: however, it may be possible to simply copy $P_{12d}$ and accept limited quality degradation caused by the mismatch, although all pictures after the splice may need the temporal reference to be changed. As described above, in the first option REF_PIC may be replaced by changing the frame type of $B^*_{4s}$ to preserve the clean break.

Turning to the field sequence, this must be preserved across a seamless join. Normally with frame-structured coding without using 3:2 pulldown this is the default action when edits are based on frames or field-pairs. In case repeat_first_field (rff) and top_field_first (tff) flags are used (MPEG-standard encoder options) then care is needed to ensure field dominance preservation. This will be made easier if every coded picture is time-stamped DTS/PTS (Decoding Time Stamp/Presentation Time Stamp). In case they are not time-stamped it is necessary to look at the rff and tff flags to determine the field sequence. This is a further criterion that must be met on a jump.

In order to give the "clean break" at the edit points, the multiplexing is constrained so that all data for SEQ.1 is delivered to the input of the STD before the first data for SEQ.2 is delivered. This gives a single discontinuity point in the supplied data. Note that both SEQ.1 and SEQ.2 when considered independently may suitably (although not essentially) comply with ISO/IEC 13818-1 P-STD, although other multiplexing methods may be used. The coding and multiplexing of video packs in both SEQ.1 and SEQ.2 are constrained for buffering continuity, as will be described below.

The last audio packet of an audio stream in SEQ.1 contains the sample that has a presentation interval that includes the end of the presentation period of the last video picture in SEQ.1. The first audio packet of an audio stream in SEQ.2 contains the sample that has a presentation interval that includes the start of the presentation period of the first video picture in SEQ.2. This definition means audio packets at the end of SEQ.1 and at the start of SEQ.2 may overlap in their delivery time: the required player behaviour in this case will be defined below.

During playback of a sequence, while playing back a single sequence, data from only a single time-base is present in the STD buffers, with the STD model operating as for the P-STD model defined in ISO/IEC 13818-1 (MPEG-2 Systems): in this way, continuous presentation of both audio and video can be guaranteed.

Figure 8:
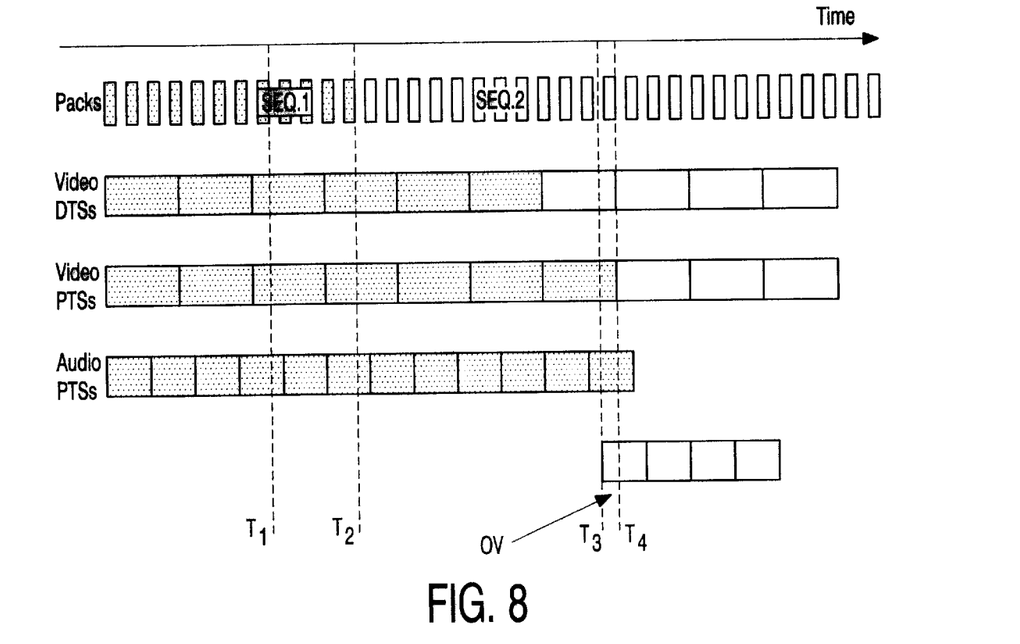
FIG. 8 schematically represents differences in duration of video and audio signal frames and their relation to data pack size.

During the transition from one sequence to another, it is likely that the time-base of SEQ.2 will not be the same as SEQ.1. It is required that the presentation of video data will continue seamlessly. There may be an overlap OV in the presentation time of audio presentation units, as illustrated in FIG. 8.

Figure 9:
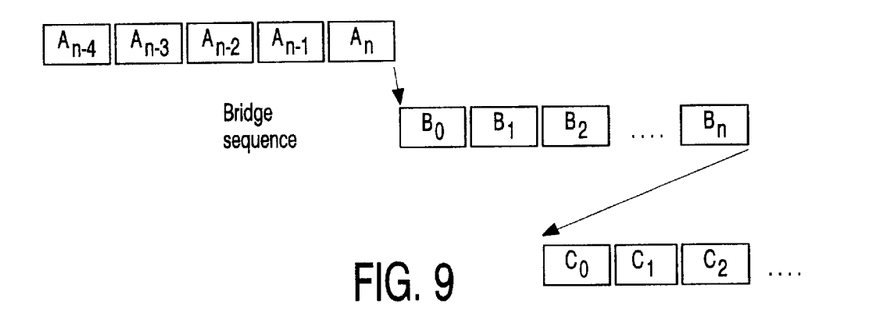
FIG. 9 represents the creation of a bridge segment between two A/V frame sequences.

In terms of handling time stamp discontinuities for the MPEG stream, with a jump from a first sequence to the bridge sequence and then on to the second sequence, there will be a change in the time-base of the SCR/DTS/PTS time-stamps recorded with the streams at the discontinuity where the two sequences meet in the middle of the bridge. FIG. 9 illustrates this arrangement for the following example, with the bridge sequence B between first sequence A and second sequence C. In the example, each picture has a size in bytes given by An.

Each picture has decoding and presentation time stamps based on the system clock $DTS_{An}$, $PTS_{An}$.

Each picture has a value for DTS and PTS recorded in the bitstream or inferred from previous values recorded in the bit-stream $DTS'_{An}$, $PTS'_{An}$.

Each picture has a start code that is delivered into the STD model at a time that can be derived from the recorded SCR values $SCR'_{An}$.

Each picture has a start code as an actual time in the STD model at which data is delivered into the STD buffer $SCR_{An}$.

The picture period is T.

For sequence A:

$SCR'_{An} = SCR_{An}$ and $DTS'_{An} = DTS_{An}$ applying for all pictures n (in other words, the system clock in the player and the time-base recorded in the stream are the same). In cases where this is not true (for example after a previous jump) they will differ by a constant.

Considering the timing of video presentation, the presentation is continuous without a gap through the connection. Using the following:

$PTS^1_{end}$ the PTS in the bitstream of the last video presentation unit of SEQ.1.

$PTS^2_{start}$ the PTS in the bitstream of the first video presentation unit of SEQ.2.

$T_{pp}$ the presentation period of the last video presentation unit of SEQ.1.

Then the offset between the two time-bases, STC_delta, is calculated from data in the two bitstreams as follows:

$$STC\_delta + PTS^2_{start} = PTS^1_{end} + T_{pp}$$

Hence $$STC\_delta = PTS^1_{end} - PTS^2_{start} + T_{pp}$$

Up until time, $T_1$ ($SCR^1_{video\_end}$), the time when the last video pack of SEQ.1 has completely entered the STC, input timing to the STD is determined by the SCR's of the packs in SEQ.1 and the STC. The remaining packs of SEQ.1 shall enter the STD at the mux_rate of SEQ.1. The time at which the last byte of SEQ.1 enters the buffer is $T_2$. If N is the number of bytes in the trailing audio packets, then one of a number of possible calculation options would be to use:

$$\Delta T = T_2 - T_1 = N/\text{mux\_rate}$$

After time $T_2$, input timing to the STD is determined by the time-base STC' and the SCR's of SEQ.2, where STC' is calculated as follows:

$$STC' = STC + SCR\_delta$$

Note that this definition of the input schedule creates an overlap in the delivery time of trailing audio access units of SEQ.1 and any leading audio access units of SEQ.2. There is no overlap or interleaving of the data between the two sequences. Video packs shall be constructed so that they do not overlap. Decoders require some additional audio buffering (about 1s) to handle the overlap in time-bases.

In relation to buffering there are several situations to be considered. The most restrictive is when full compliance to the MPEG-2 PS STD model is required. A more relaxed consideration allows an increased (double-sized) buffer during the transitions into the bridge sequence. For full STD compliance, MPEG PS has a requirement that data does not spend more than 1s in the STD buffer. Therefore 1s after a jump it is known that the only data in the STD buffer comes from the new sequence.

We can construct the delivery time (SCR) of the last byte of the last pack containing video data delivered from SEQ.1 by examining the SCR values of the packets of SEQ.1 and from mux_rate: in the following this value is $SCR^1_{video\_end}$. Taking:

$SCR^1_{video\_end}$ as the value of STC measured as the last byte of the last video pack of SEQ.1 is delivered to the STD: it can be calculated from the SCRs in the pack headers of SEQ.1 and mux_rate.

$SCR^2 video_{\_start}$ as the value of SCR coded in the first video pack of SEQ.2 (measured in the time base of SEQ.2)

$SCR^2_{video\_start}$ as the value of $SCR'^2_{video\_start}$ projected onto the time-base of SEQ.1: this may be calculated as follows:

$$SCR^2_{video\_start} = SCR'^2_{video\_start} - STC\_delta$$

For the STD to be compliant across the jump two conditions are required, the first of which is delivery of trailing audio in SEQ.1 (followed by leading audio in SEQ.2) should be contained in the interval defined by $SCR^1_{video\_end}$ and $SCR^2_{video\_start}$, as follows:

$$SCR^1_{video\_end} + \Delta T_A < SCR^2_{video\_start} + \Delta T_B$$

Note that $\Delta T_B$ has been added to the inequality as a result of allowing leading audio packets in SEQ.2. To satisfy this inequality, it may be necessary to re-encode and/or remultiplex part of one or both sequences. The second required condition is that delivery of video from SEQ.1 followed by video from SEQ.2, as defined by the SCRs in SEQ.1 and SCRs in SEQ.2 projected onto the same time-base, shall cause no video buffer overflow.

Figure 10:
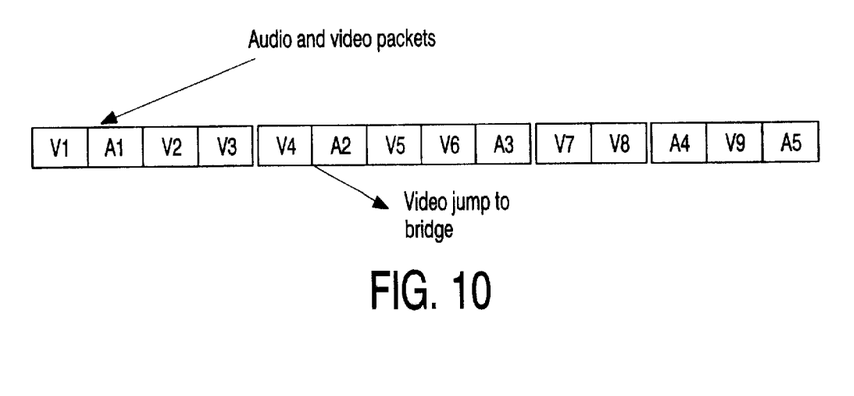
FIG. 10 illustrates audio packet lag in a compound A/V packet stream.

Turning to the audio issues, and beginning with packet alignment, there is normally a substantial skew between the arrival times of concurrently decoded audio and video (approximately >100 ms on average). This means that, at the end of reading the last frame of video required from sequence A, another several frames of audio (and of course video unless it can be skipped) have to be read from the multiplexed stream. Either the jump must be delayed and the video stopped, or prefereably the audio must be remultiplexed into the bridge sequence. Referring to FIG. 10, if video packet V4 contains the end of the last video picture before the jump. it is probable that audio packets A2, A3, A4 will need to be extracted from sequence A and copied and remultiplexed into the bridge sequence.

The same situation applies with the jump back into sequence C after the bridge. The first audio frames reached are likely to be earlier in presentation time than the video at the jump point, but the audio must be continuous across the jump. Having chosen the jump point for video, it is necessary to make sure that the audio in the bridge sequence will match the audio in sequence C.

In terms of audio gaps, because of the difference in audio and video frame duration, there will be breaks in the periodicity of audio framing at the point a seamless (in video) splice is made. This break is up to about 1 audio frame (24 ms) in length. It will occur near the video frame that marks the splice. Timing information in the play list would help the audio decoder to manage this break.

At the disc allocation level, once the elementary streams and multiplex requirements have been met, it is also necessary to ensure that the bridge sequence is long enough so that it can be allocated to a contiguous range of addresses on the disc, and that the sections on either side of the bridge in sequence A and sequence C remain long enough. An example of this is described in our commonly assigned European patent application no. 98200888.0, filed Mar. 19, 1998. The basic requirement is that for one particular disc configuration, the bridge sequence is between 2–4 Mbytes in length and that the parts of fragments on either side of the bridge remain longer than 2 Mbytes: this restriction is not, however, applicable to all cases.

In the foregoing, we have described a means to address the problem of making video- and/or audio-frame accurate edits in MPEG-compliant and similar program streams where, because of the temporal dependencies and buffering models used in MPEG and similar coding and multiplexing techniques, simple cut-and-paste edits cannot be made at any frame boundary. In order to facilitate editing, we generate bridge sequences—that is to say short sequences of coding-compliant data that are especially constructed (in the manner described above) to link together two original recordings of MPEG or similar data.

From reading the present disclosure, other variations will be apparent to persons skilled in the art. Such variations may involve other features which are already known in the methods and apparatuses for editing of audio and/or video signals and component parts thereof and which may be used instead of or in addition to features already described herein.

What is claimed is:

1. A data processing apparatus, comprising:
   means for reading a first frame sequence of frame-based data and a second frame sequence of frame-based data from a storage device and for editing the first and second frame sequences, to link from a first edit point in the first frame sequence to a second edit point in the second sequence, wherein for each of the stored first and second frame sequences a number of the frames (I-frames) are intra-coded without reference to any other frame of the sequence, a number (P-frames) are respectively coded with reference to one further frame of the sequence, and the remainder (B-frames) are respectively coded with reference to two or more further frames of the sequence; and
   joining means for seamlessly joining the first frame sequence to the second frame sequence, said joining means including bridge generation means configured to create a bridge frame sequence to link the first and second edit points by a jump from the first edit point to the bridge frame sequence and a jump from the bridge frame sequence to the second edit point, and by selective incorporation of frames from the stored first and second frame sequences and selective recoding of one or more of the frames within the bridge sequence as determined by the coding type (I,P,B) of the frames from the first and second sequences indicated by the respective edit points.

2. The Apparatus as claimed in claim 1, wherein the sequence frames are video image frames and the bridge generation means is configured to construct the edited sequence with the jump from the first sequence to the bridge frame sequence and the jump from the bridge frame sequence to the second sequence occurring at frame boundaries.

3. The Apparatus as claimed in claim 1, wherein the sequences comprise multiplexed arrangements of video image and audio data frames and the bridge generation means is arranged to present in the bridge sequence all contributing video frames from the first sequence prior to the contributing video frames from the second sequence.

4. The Apparatus as claimed in claim 3, wherein in the bridge sequence at the join between first and second sequence there is a gap of up to one audio frame in duration and the bridge generation means is arranged to insert an overlapping audio frame in this gap.

5. The Apparatus as claimed in claim 1, wherein the bridge generation means is arranged to detect respective time stamps in the first and second sequences and includes means operable to derive a value specifying a discontinuity between the time stamps, to calculate an offset to be applied to time stamps of the second sequence to remove said discontinuity and to apply said offset to the second sequence.

6. The Apparatus as claimed in claim 1, wherein the bridge generation means, on receiving specification of a target length for the bridge sequence, is arranged to vary the number of frames extracted from at least one of the first and second sequences such as to meet the target length.

7. The Apparatus as claimed in claim 6, wherein the bridge generation means is arranged to shift at least one of the first and second edit points to result in the target length for the bridge sequence.

8. The Apparatus as claimed in claim 6, wherein the bridge generation means is arranged to selectively extract frames of the first sequence before at least one of the first edit point and frames of the second sequence after the second edit point to result in the target length for the bridge sequence.

9. The Apparatus as claimed in claim 1, wherein the storage device is writable, the apparatus further comprising a device recording sub-system operable to write one or more sequences of frame-based data to storage locations on or within the storage device.

10. A method for editing sequences of frame-based data to link from a first edit point in a first frame sequence to a second edit point in a second sequence, wherein for each of the frame sequences a number of the frames (I-frames) are intra-coded, without reference to any other frame of the sequence, a number (P-frames) are respectively coded with reference to one further frame of the sequence, and the remainder (B-frames) are respectively coded with reference to two or more further frames of the sequence, the method including:

seamlessly joining the first frame sequence to the second frame sequence, said seamlessly joining including creating a bridge frame sequence to link the first and second edit points by a jump from the first edit point to the bridge frame sequence and a jump from the bridge frame sequence to the second edit point, the bridge frame sequence incorporating frames from the first and second frame sequences with selective recoding of frames within the bridge sequence being determined by the coding type (I,P,B) of the frames from the first and second sequences indicated by the respective edit points.

11. The method as claimed in claim 10, wherein the frames of the first and second sequences are video image frames and the edited sequence is constructed with the jump from the first sequence to the bridge frame sequence and the jump from the bridge frame sequence to the second sequence occurring at frame boundaries of the first and second sequences.

12. The method as claimed in claim 10, wherein the sequences comprise multiplexed arrangements of video image and audio data frames, with presentation in the bridge sequence of all contributing video frames from the first sequence prior to the contributing video frames from the second sequence.

13. The method as claimed in claim 12, wherein in the bridge sequence at the link between first and second sequence audio frames there is a gap of up to one audio frame in duration which gap is filled by an overlapping audio frame.

14. The method as claimed in claim 10, further including:

detecting respective time stamps in the first and second sequences;

deriving a value specifying a discontinuity between the time stamps;

calculating an offset to be applied to time stamps of the second sequence to remove said discontinuity; and applying said offset to the second sequence.

15. The method as claimed in claim 10, wherein the storage device is an optical disc and the location of the first and second sequences thereon is indicated by a table of contents held by the disc.

16. The method as claimed in claim 10, wherein the frame indicated by the first edit point is a B-frame and the jump to the first frame of the bridge frame sequence is made on the nearest preceding P-frame in the display order of the first sequence.

17. The method as claimed in claim 16, wherein the first frame of the bridge sequence following the jump thereto comprises a reference frame extracted from the second sequence followed by those B-frames of the first sequence up to the first edit point, said B-frames having been re-encoded with reference to the reference frame.

18. The method as claimed in claim 10, wherein the frame indicated by the first edit point is an I-frame or a P-frame and the jump to the first frame of the bridge sequence is made following the nearest preceding B-frame in the display order of the first sequence.

19. The method as claimed in claim 10, wherein the frame indicated by the second edit point is a B-frame and the bridge sequence frames preceding the jump to the second sequence comprise those second sequence frames from the nearest P-frame preceding the indicated frame in bit stream order and any intervening B-frames.

20. The method as claimed in claim 10, wherein the frame indicated by the second edit point is a P-frame and the bridge sequence frame preceding the jump to the second sequence comprises the P-frame.

21. The method as claimed in claim 19 or claim 20, wherein the contents of a P-frame included prior to the jump from the bridge sequence to the second sequence are re-encoded in the bridge sequence as an I-frame.

22. The method as claimed in claim 10, wherein the frame indicated by the second edit point is an I-frame and the bridge sequence frame preceding the jump to the second sequence comprises the I-frame.

23. A storage device comprising a plurality of frame sequences together with one or more bridge sequences linking respective pairs of sequences at specified edit points and a table of contents identifying the respective storage address of each frame sequence and bridge sequence, each bridge sequence having been generated following the method of claim 10.

* * * * *